Patented May 23, 1950

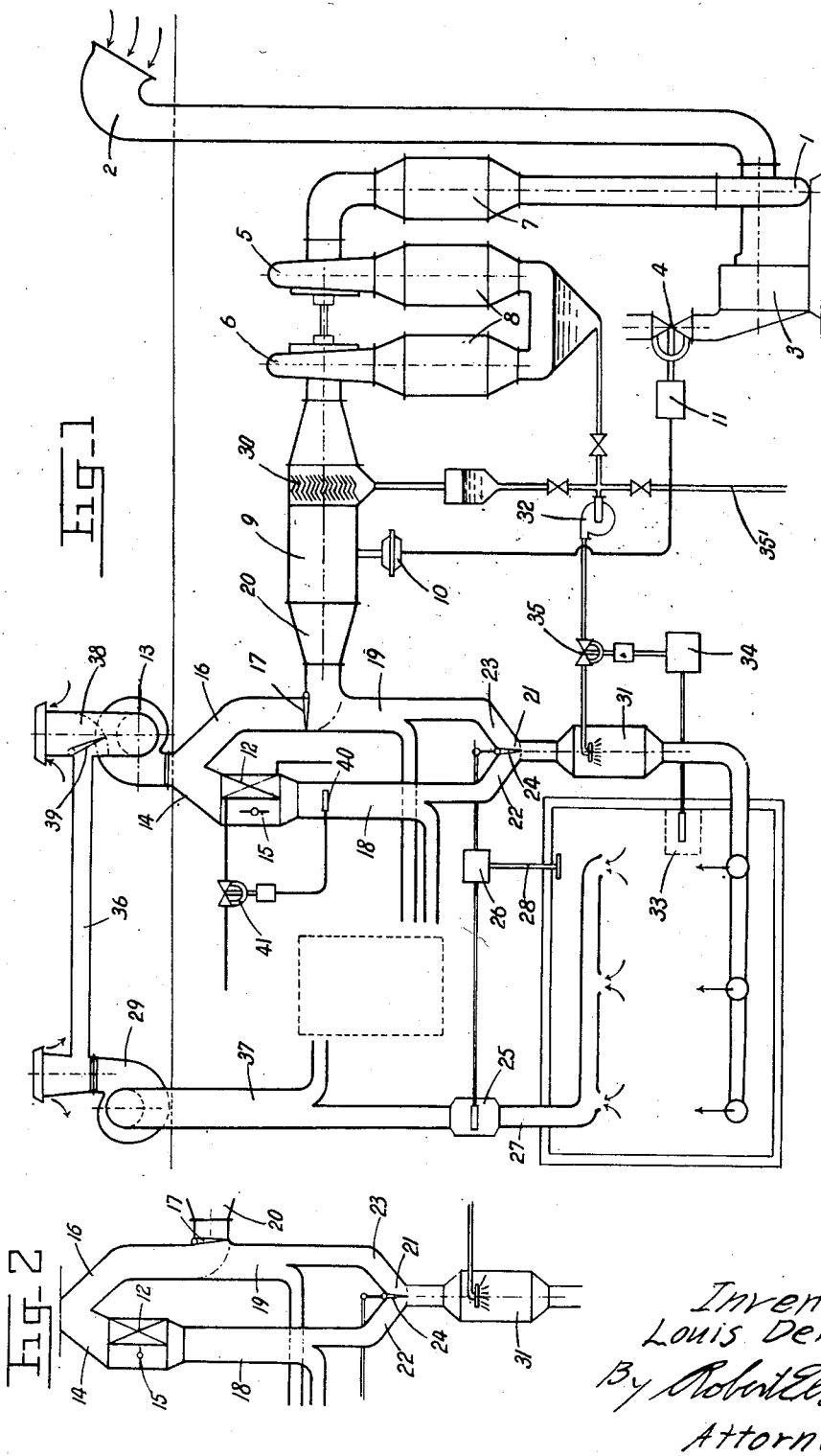

2,508,749

UNITED STATES PATENT OFFICE 2,508,749

AIR CONDITIONING SYSTEM

Louis Denis, Lille, France, assignor of one-half to Societe Anonyme des Etablissements Neu, Lille, France, a French company Application February 4, 1948, Serial No. 6,235
In France February 4, 1947

2 Claims. (Cl. 257—3)

This invention relates to an air-conditioning arrangement suitable for use in all premises and particularly on ships, in aircraft, in vehicles and the like.

The invention is characterised by the use of an air refrigerating machine, so that the air used in the air refrigerating machine is the same as that used as the cooling fluid and is then distributed within the premises, if desired, in admixture with the external air or with the air recovered. The invention is also characterised by the combination of such an air refrigerating arrangement with a special distributing system and a combination of regulating devices.

The distribution of air is carried out by means of two networks, one for hot air and the other for cold air. The first network distributes in winter the air heated by an air heater and in summer the external air, while the second network distributes in winter the external air and in summer the air treated by the air refrigerating machine. The change-over from summer operation to winter is effected by manual or automatic control of a system of dampers or regulators.

The use of regulating devices permits of arranging that the mixtures of hot and cold air taken from the distributing pipes or ducts of the two networks takes place both in summer and in winter automatically, or by means of a manual control, as a function of conditions to be produced in the premises or groups of premises in question, regardless of the variations in the various factors of the installation.

The invention consists in the use of a regulating device which automatically assures the adaptation of the power of the motor of the refrigerating machine to the cold required by the air-conditioning installation.

The invention also provides for the automatic adaptation of the refrigeration output to the amount of cold required by the installation, each increase in the heat of the external air being compensated for by an increase in the refrigeration output of the installation.

Air-conditioning installations have hitherto been provided on board ships, in aircraft or in road or railway vehicles and the like, which are characterised by the use of a cooling fluid such as ammonia, carbon dioxide gas, methyl chloride, water vapour and the like or by the use of a cooling fluid such as iced water or brine or the like.

The use of these fluids entails certain disadvantages because some of them are poisonous or corrosive or cause heat to be given off or are inflammable or have other undesirable features.

Furthermore, the use of such fluids leads to heavy installations occupying a large amount of space. Now, it is known that weight is a serious disadvantage on board a ship, in aircraft or in vehicles since there is required for any additional weight on board, for an equal performance, a certain additional power in the propulsion engine, which is added to the actual power required for the operation of the installation.

The invention provides an air-conditioning installation of considerably reduced weight, since the only fluid employed as the cooling and cold-producing fluid is the atmospheric air.

The use of the air as the sole fluid also ensures perfectly reliable operation and other advantages such as simplicity of control, maintenance and the like.

Finally, in the known arrangements the available quantity of cold supplied to the air treated is substantially constant, and in particular it cannot be adapted to any overload due to deterioration of the conditions of the external air.

The invention provides an installation of which the available refrigeration output increases when the heat of the external air increases, for example when the temperature and humidity of the external air increase separately or together, because the temperature of the air treated depends essentially upon the temperature of the source of cold and remains substantially constant regardless of the conditions of the external air.

The constructional embodiment of the invention illustrated on the accompanying drawing, by way of non-limitative example, permits of combining these various advantages and those resulting from the use of regulating devices which, when employed separately or in combination, tend to produce in the different premises or groups of premises, pre-determined air-conditions regardless of the variations of the various factors of the installation, such as variation of the number of occupants, variation of external temperature and of humidity, variation of the temperature of adjacent premises, variation of the temperature of the source of cold, etc.

On the accompanying drawing:

Figure 1 shows diagrammatically a form of embodiment of the invention, in particular for installation on board ships, and Figure 2 shows the double-pipe or double-duct distribution system, the dampers or regulators being in a position of operation differing from that of Figure 1.

A first air compressor 1 sucking the external air through an air intake 2 is actuated by a motor 3 of which the power is regulated by an instrument 4. A second air compressor 5 sucks in the air compressed by the compressor 1 and increases its pressure. It is actuated by a motor 6 of a suitable type utilising the expansion of the compressed air.

After the first compression stage, the air is cooled by one or more intermediate coolers 7 employing as its source of cold sea water, or if desired when at anchor soft fresh water, or any other suitable fluid.

After the second compression stage, the air is cooled by one or more intermediate coolers 8.

The external air loses during its passage after compression in these various coolers a certain quantity of the water which it contained. In the air motor, it expands and becomes cooled and also loses some of the water which it contained.

After its expansion in the air motor, the air is defused in such a manner as to reduce it to a low speed in a chamber 9, called a "balancing chamber." This chamber is maintained at substantially constant static pressure by the action of a regulating device consisting, for example, of pressure responsive means 10, which acts through a relay 11 on the instrument 4 for regulating the power or the speed of the motor 3, for example in the case of a steam turbine or a steam engine on the regulator thereof in the case of a Diesel engine on the injection, in the case of an electric motor on the exciting circuit, and so on.

The combination of the compressors, the motors thereof, the coolers, the balancing chamber, the system for regulating the power and the accessories thereof, constitutes the air refrigerating machine, which will function in conditions which will be referred to as "summer conditions."

An air heater 12 of suitable type, utilising a suitable source of heat, will be employed in conditions which will be referred to as "winter conditions."

The hot or cold air treated will be distributed within the premises by an air-distributing system constituting one of the features of the invention.

Automatically or manually controlled mixers for mixing the hot or cold air treated with external air, and with recovered air, or a previously prepared mixture of external and recovered air, each mixer being fed through a special cold-air duct and a special hot-air duct.

The first network of ducts distributes in winter conditions the air heated by the air heater, and in summer conditions the external air.

The second network of ducts distributes in winter conditions the external air and in summer conditions the air treated by the air refrigerating machine.

The change-over from summer conditions to winter conditions is obtained by means of the following device, which constitutes one of the features of the invention:

A delivery fan 13 delivers the external air into two distributing pipes, one of which, 14, guides some of the air towards the air heater 12, this air heater being provided with a by-pass device constituted, for example, by a damper or regulator 15. The external air is also delivered into a second distributing pipe 16. This second distributing pipe can be partly or completely closed by a second regulator or damper 17.

The first network of ducts, called the hot-air network, is constituted at its origin by a distributing pipe 18 taking in the air as it leaves the heater 12.

The second network of ducts, called the cold-air network, is constituted at its origin by the connection into one single distributing pipe 19 of a pipe 20 disposed on the outlet side of the balancing chamber 9, and of the distributing pipe 16, the regulator or damper 17 permitting of taking the air either from the pipe 20 or from the pipe 16.

Each mixer 21 is fed through two secondary distributing pipes 22 and 23, each of which is fed by a tapping from the principal hot-air and cold-air distributing pipes 18, 19.

The change-over from summer conditions to winter conditions is obtained by actuating the damper 15 and the damper 17. In summer conditions, as illustrated by Figure 1, the damper 15 is open and the damper 17 is closed. Consequently, the hot-air network receives external air and the cold-air network receives air treated by the air refrigerating machine.

In winter conditions, as illustrated by Figure 2, the damper 15 is partially or completely closed and the damper 17 is opened and closes the outlet from the distributing pipe 20. Consequently, the hot-air network receives the air treated by the air heater and the cold-air network receives external air.

The mixers are allocated to individual premises or groups of premises. They are actuated by automatic or manual control, for example in the modification shown in the drawings, the mixer 21 is provided with a damper 24 actuated by a thermostatic instrument 25, directly or through a relay 26. This thermostatic instrument is placed in the intake pipe for the vitiated air 27 from the premises and its action tends to maintain predetermined temperature conditions in the premises. A manual control device 26 may be provided to correct or modify the action of the thermostatic instrument, for example in order to obtain a preliminary cooling of the air before occupation of the premises by a large number of people.

A fan 29 can be provided to evacuate the vitiated air from the different premises.

The installation may be completed by devices for producing predetermined degrees of humidity within the premises. For this purpose, the water recovered in the coolers 7 and 8, or after expansion of the air in a set of baffles 30, can be utilised, this water being atomised in humidifying chambers 31, for example by means of compressed ar, which may be some of the air compressed by the compressors 1 and 5, or by means of a pump 32. The cold contained in the condensed water is thus recovered, whereby a supplementary cooling action is obtained.

The quantity of water thus atomised may be regulated by a device comprising essentially a hygrostat 33 which actuates, either directly or through a relay 34, a gate valve 35 regulating the output of water to be atomised.

The humidifying device can be employed in winter, and in this case the pump 32 will be fed by a special water circuit 35'. If desired, any other suitable method of humidification, such as injection of steam may be employed.

A partial or complete recovery of the air sucked into the premises may be employed by providing a distribution pipe 36 connecting the network 37 for the air sucked into the external air intake 38, a set of dampers composed essentially of a damper 39 permitting of obtaining zero recovery or a partial or complete recovery.

In summer conditions, the regulating system permits of obtaining the desired conditions within the premises regardless of the variations of the different factors of the installation. For example, if the external temperature rises in summer conditions, the temperature of the premises will rise, and the thermostatic instrument 25 will actuate the damper 24 of the mixer 21 through the relay 26. The air introduced into the premises will comprise a greater proportion of air treated by the refrigerating set, which will tend to re-establish the required conditions by reducing the temperature of the air after mixing.

If the temperature of the sea water increases, the temperature of the expanded air will increase and before any change in the position of the damper 24 of the mixer 21 there will be an increase in the temperature of the premises, and consequently an increase in the temperature of the air in the recovery pipe.

The thermostatic instrument 25 will act as before on the mixer so as to re-establish the required conditions.

Similarly, if the number of occupants of the premises in question increases, the temperature of the recovered air will increase and the thermostatic instrument will act as before so as to re-establish the required conditions. The same is the case whenever for any reason the temperature of the room increases. On the other hand, if the temperature of the room tends to decrease, the thermostatic instrument will act in the opposite sense to reduce the requirement for cold air from the refrigerating machine.

In winter conditions, the operation of the regulating arrangement will be the same, since the hot-air network and the cold-air network both feed the mixer 21 through the same secondary pipes 22 and 23, and consequently the action of the thermostatic instrument on the damper 24 of the mixer 21 will be the same.

Consequently, when variations of the factors of the installation tend to vary the temperature of the premises, the action of the regulating devices will tend to re-establish the required conditions within the premises regardless of the reasons for these variations and regardless of whether summer or winter conditions prevail.

However, the manual regulator 28 may if desired be adapted to bring about within the premises a predetermined temperature different from that of summer conditions.

The combined action of the regulating devices allocated to the individual premises or sets of premises on the total requirement of cold is such that the output of the air refrigerating machine will be continuously adapted to the cold requirement of the installation by the operation of the regulator 4 of the motor 3. In fact, it will be assumed that the damper 24 of the mixer 21 is moved and further reduces the admission of cold air. During this movement of the damper, the output of air from the refrigerating machine remains constant, and the static pressure in the balancing chamber 9 is increased because the loss of pressure in the cold air circuit increases.

At this moment, the pressure responsive means 10 acts through the relay 11 on the regulator 4 of the motor 3 of the air refrigerating machine so as to slow down the motor 3 and thus to reduce the output of cold air.

The power of the air refrigerating machine is therefore reduced to the requirement of the air-conditioning installation, this requirement being a function of the combination of the various positions of all the automatic or manual mixers feeding the premises or group of premises.

Similarly, when the amount of cold required by the installation increases, the regulating devices cause, by their combined action, an increase in the output which the motor of the air refrigerating machine is required to supply.

The use of air as the sole cold-producing and cooling fluid therefore leads to an extremely economical and very flexible installation, the inertia of the whole being extremely low in contrast to what is the case in installations comprising one or more cold-producing and cooling or intermediate fluids which are frequently used in considerable masses.

In winter conditions, the installation can also be operated in a flexible and economical manner by employing a regulating device comprising, for example, a thermostatic instrument 40 located at the outlet end of the air heater and actuating either directly or indirectly a gate valve 41 which feeds the air heater with steam.

If the amount of heat required by the installation decreases, the action of the dampers of the mixers 21 tends to reduce the amount of hot air required and consequently the output of hot air passing through the heater.

At this moment, the temperature of the air in the hot air distributing pipe 18 will increase and the action of the thermostatic instrument 40 on the gate valve 41 will reduce the amount of steam required.

Conversely, if the requirement for hot air increase, the output of hot air passed through the heater will increase, its temperature will drop and the thermostatic instrument 40 will actuate the valve 41 so as to increase the out-put of steam.

Finally, the installation possesses in summer conditions the property of having an increasing refrigeration output when the heat of the external air increases.

In fact, regardless of the temperature and the humidity of the external air, its temperature after the various stages of compression and cooling and before expansion will be in the neighbourhood of that of the water employed in the cooling if the coolers 7 and 8 have suitable surfaces.

Consequently, the temperature of the air after expansion depends essentially upon the temperature of the water and not upon the external temperature and humidity.

If the heat of the external air increases, then since the heat of the air treated and the output of air treated both remain constant, the refrigerating output, which is equal to the product of the output by weight of air and by the fall in the heat per kilogramme of air, increases.

One of the features of the invention is therefore the automatic adaptation of the refrigerating output to the requirements of the installation, any increase in the temperature or in the humidity of the external air causing an increase in the output of cold.

I claim:

1. An air conditioning system in particular for ships, aircraft, trains and the like, comprising two air ducts having a common inlet and a common outlet, a fan connected to said inlet for sending air through said ducts, a mixing chamber connected to said outlet and communicating with the room to be air conditioned, first damper means mounted in said outlet adapted to respectively regulate the outlet openings of said two ducts, air heater means in one of said ducts, a by-pass chamber in parallel with said heater means and having second damper means mounted therein, an air cooling system opening into the second of said ducts adapted to send cooled air therethrough, third damper means mounted in said second duct and adapted to close either said second duct or the inlet opening of said cooling system into said duct, said second damper means serving to close said by-pass chamber, and said third damper means serving to close said cooling system inlet to allow during winter conditions the passage of heated air through said first duct and of fresh air through said second duct respectively, and said second damper means furthermore serving to open said by-pass chamber and said third damper means serving to close said second duct, thereby opening said cooling system inlet therein to allow during summer conditions the passage of fresh air through said first duct and the passage of cooled air through said second duct.

2. An air conditioning system in particular for ships, aircraft, trains and the like, comprising two air ducts having a common inlet and a common outlet, a fan connected to said inlet for sending air through said ducts, air heating means in one of said ducts having a by-pass, damper means in said by-pass, an air cooling system opening into the second of said ducts, damper means in said second duct for closing either said second duct or the inlet opening of said cooling system, said cooling system comprising in series first air compressing means, first air cooling means, second air compressing means, second air cooling means, an air expansion motor coupled to said second air compressing means, and a balancing chamber opening into said second duct, said air cooling system further comprising a control motor driving said first air compressing means, and a regulating device regulating the speed of said control motor and reacting to the pressure in said balancing chamber, thereby tending to maintain a constant pressure in said chamber.

LOUIS DENIS.

REFERENCES CITED

The following references are of record in the file of this patent:

UNITED STATES PATENTS

| Number | Name | Date |
|---|---|---|
| 2,077,315 | Ewing et al. | Apr. 13, 1937 |
| 2,196,494 | Gibbs | Apr. 9, 1940 |
| 2,254,185 | Newton | Aug. 26, 1941 |
| 2,257,916 | Poythress | Oct. 7, 1941 |
| 2,419,477 | Binder | Apr. 22, 1947 |